(12) United States Patent
Finley

(10) Patent No.: US 8,915,011 B1
(45) Date of Patent: Dec. 23, 2014

(54) MECHANICAL FISH HOOK ASSEMBLY

(71) Applicant: James N. Finley, Lenior, NC (US)

(72) Inventor: James N. Finley, Lenior, NC (US)

(*) Notice: Subject to any disclaimer, the term of this patent is extended or adjusted under 35 U.S.C. 154(b) by 0 days.

(21) Appl. No.: 14/174,290

(22) Filed: Feb. 6, 2014

Related U.S. Application Data

(60) Provisional application No. 61/792,387, filed on Mar. 15, 2013.

(51) Int. Cl.
*A01K 83/02* (2006.01)
*A01K 85/00* (2006.01)

(52) U.S. Cl.
CPC .............. *A01K 83/02* (2013.01); *A01K 85/00* (2013.01)
USPC ........................................ 43/36; 43/34; 43/35

(58) Field of Classification Search
USPC ..................... 43/34–37, 15, 53.5
See application file for complete search history.

(56) References Cited

U.S. PATENT DOCUMENTS

| | | | | |
|---|---|---|---|---|
| 243,622 A * | 6/1881 | Rentz et al. | ................. | 43/36 |
| 456,776 A * | 7/1891 | Prior | ................. | 43/36 |
| 644,960 A * | 3/1900 | Anderson | ................. | 43/36 |
| 684,211 A * | 10/1901 | Ferch | ................. | 43/36 |
| 745,221 A * | 11/1903 | Miller | ................. | 43/34 |
| 797,281 A * | 8/1905 | Henzel | ................. | 43/43.6 |
| 814,624 A * | 3/1906 | Robinson | ................. | 43/36 |
| 984,596 A * | 2/1911 | Osmond | ................. | 43/43.4 |
| 1,156,795 A * | 10/1915 | Mau | ................. | 43/36 |
| 1,290,144 A * | 1/1919 | Evans | ................. | 43/36 |
| 1,381,003 A * | 6/1921 | Pierson | ................. | 43/35 |
| 1,513,011 A * | 10/1924 | Russell et al. | ................. | 43/43.2 |
| 1,591,640 A * | 7/1926 | Middleton | ................. | 43/36 |
| 1,649,140 A * | 11/1927 | Steffens | ................. | 43/36 |
| 1,869,293 A * | 7/1932 | Wolford | ................. | 43/43.6 |
| 2,004,316 A * | 6/1935 | Foote | ................. | 43/36 |
| 2,119,504 A * | 5/1938 | Lawrence | ................. | 43/43.6 |
| 2,160,347 A * | 5/1939 | Walsh | ................. | 43/43.6 |
| 2,176,820 A * | 10/1939 | McConnell | ................. | 43/37 |
| 2,209,300 A * | 7/1940 | Shipman | ................. | 43/36 |
| 2,219,225 A * | 10/1940 | Gambill | ................. | 43/43.2 |
| 2,260,923 A * | 10/1941 | Thompson | ................. | 43/34 |
| 2,424,599 A * | 7/1947 | Burns | ................. | 43/43.4 |
| 2,449,045 A * | 9/1948 | Athans | ................. | 43/36 |
| 2,531,941 A * | 11/1950 | Kissell | ................. | 43/36 |
| 2,570,468 A * | 10/1951 | Matthes | ................. | 43/43.2 |
| 2,592,727 A * | 4/1952 | Pamer | ................. | 43/15 |
| 2,608,786 A * | 9/1952 | Schwartz | ................. | 43/36 |
| 2,629,959 A * | 2/1953 | Dalton | ................. | 43/37 |
| 2,722,078 A * | 11/1955 | Nikota | ................. | 43/36 |

(Continued)

FOREIGN PATENT DOCUMENTS

| | | | | |
|---|---|---|---|---|
| DE | 3307604 A1 * | 9/1984 | ............ | A01K 83/02 |
| JP | 01273530 A * | 11/1989 | ............ | A01K 83/02 |

(Continued)

*Primary Examiner* — Darren W Ark
(74) *Attorney, Agent, or Firm* — Schwartz Law Firm, P.C.

(57) ABSTRACT

A mechanical hook assembly for catching fish. The hook assembly comprises a hook having an elongated shank, bend, and point. A spring-biased trigger resides adjacent the hook and comprises an elongated distal point guard, an intermediate latch, a proximal spring shaft, and spring. The spring normally urges the hook assembly into an open spread condition, such that the spring shaft of the trigger extends outwardly at an angle to the shank of the hook and in a direction opposite the bend. A catch is located beside the shank of the hook.

16 Claims, 15 Drawing Sheets

(56) References Cited

U.S. PATENT DOCUMENTS

| | | | | |
|---|---|---|---|---|
| 2,864,198 A * | 12/1958 | Edwards | | 43/37 |
| 2,979,848 A * | 4/1961 | McConnell | | 43/36 |
| 2,982,047 A * | 5/1961 | Wilshusen | | 43/36 |
| 3,006,101 A * | 10/1961 | Zeman | | 43/36 |
| 3,013,357 A * | 12/1961 | Bujjoni | | 43/37 |
| 3,169,338 A * | 2/1965 | Morin | | 43/43.6 |
| 3,221,437 A * | 12/1965 | De Long | | 43/43.6 |
| 3,292,297 A * | 12/1966 | Dupont | | 43/36 |
| 3,483,650 A * | 12/1969 | Weaver | | 43/35 |
| 3,497,988 A * | 3/1970 | Childers | | 43/43.6 |
| 3,618,251 A * | 11/1971 | Hodshire | | 43/34 |
| 3,646,699 A * | 3/1972 | Zeman | | 43/35 |
| 3,986,290 A * | 10/1976 | Chapman | | 43/43.6 |
| 4,011,679 A * | 3/1977 | Smith | | 43/15 |
| 4,057,927 A * | 11/1977 | Marlowe | | 43/43.6 |
| 4,387,528 A * | 6/1983 | Kahl | | 43/36 |
| 4,476,646 A * | 10/1984 | Weiman | | 43/34 |
| 4,570,373 A * | 2/1986 | Brief | | 43/43.16 |
| 4,674,225 A * | 6/1987 | Webb | | 43/43.6 |
| 4,726,142 A * | 2/1988 | Tapley | | 43/36 |
| 4,774,784 A * | 10/1988 | Lee | | 43/36 |
| 4,854,070 A * | 8/1989 | Young | | 43/34 |
| 4,924,618 A * | 5/1990 | McGahee | | 43/43.6 |
| 4,947,574 A * | 8/1990 | Tapley | | 43/36 |
| 5,950,350 A * | 9/1999 | Norton | | 43/43.6 |
| 5,983,554 A * | 11/1999 | Storey | | 43/43.2 |
| 7,353,633 B1 * | 4/2008 | Lane | | 43/37 |
| 7,673,414 B1 * | 3/2010 | Ivey | | 43/43.6 |
| 8,393,112 B1 * | 3/2013 | Finley | | 43/36 |
| 8,578,648 B1 * | 11/2013 | Finley | | 43/36 |
| 8,726,563 B2 * | 5/2014 | Kuhlman | | 43/43.6 |
| 2013/0125448 A1 * | 5/2013 | Young | | 43/34 |

FOREIGN PATENT DOCUMENTS

| | | | | | |
|---|---|---|---|---|---|
| JP | 02124048 A | * | 5/1990 | | A01K 83/02 |
| JP | 09094041 A | * | 4/1997 | | A01K 83/02 |
| JP | 2001112375 A | * | 4/2001 | | A01K 83/02 |
| JP | 2004073155 A | * | 3/2004 | | A01K 83/02 |
| JP | 2006141388 A | * | 6/2006 | | A01K 83/02 |
| JP | 2007028946 A | * | 2/2007 | | A01K 83/02 |
| WO | WO 2009047813 A1 | * | 4/2009 | | A01K 83/02 |

* cited by examiner

MECHANICAL FISH HOOK ASSEMBLY

TECHNICAL FIELD AND BACKGROUND

The present disclosure relates broadly the recreational fishing industry, and more particularly to artificial and natural fishing lures and components adapted for use combination with such lures. In terms of recreational fishing, a lure is an object attached to the end of fishing line and designed to resemble and move like an item of fish prey. The basic purpose of the lure is to use movement, vibrations, and/or color to catch the fish's attention and to entice the fish to "bite" the hook. Conventional lures may be equipped with one or more exposed single, double, or treble hooks. Such lures are generally used with a fishing rod and fishing reel. When a lure is used for casting, it is continually cast out and retrieved—the retrieval making the lure "swim" through the water.

The concept of the present disclosure may be incorporated in many different types of fishing lures. For example, the present lure may comprise or incorporate a jig, spoon, plug (or crankbait), artificial fly, bass worm, spinnerbait, or the like. Additionally, multiple lures of the present disclosure may be used on a single line, as in the manner of a trotline.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In one exemplary embodiment, the present disclosure comprises a mechanical hook assembly for catching fish. The hook assembly comprises a hook having an elongated shank, bend, and point. A spring-biased trigger resides adjacent the hook and comprises an elongated distal point guard, an intermediate latch, a proximal spring shaft, and spring. The spring normally urges the hook assembly into an open spread condition, such that the spring shaft of the trigger extends outwardly at an angle to the shank of the hook and in a direction opposite the bend. A catch is located beside the shank of the hook.

The hook assembly is moved from the open spread condition to a loaded condition by bringing the trigger and the hook together against a biasing force of the spring, such that the latch of the trigger operatively engages the catch thereby holding the hook assembly in the loaded condition. In the loaded condition, the point guard of the trigger extends toward and beyond the point of the hook. Upon urging the point guard of the trigger towards the shank of the hook, the latch of the trigger disengages the catch, thereby releasing the hook assembly for sudden movement to the open spread condition.

According to another exemplary embodiment, the spring of the trigger comprises a coil.

According to another exemplary embodiment, a hook connector is integrally formed with the coil of the spring, and extends substantially parallel to the shank of the hook.

According to another exemplary embodiment, means are provided for joining together the shank of the hook and the hook connector of the trigger.

According to another exemplary embodiment, the means for joining comprises a weighted body formed around respective portions of the shank of the hook and the hook connector of the trigger. The weighted body may comprise lead, tin, tungsten, silver, or other metal or metal alloy.

According to another exemplary embodiment, the point guard, intermediate latch, spring shaft, and spring are integrally formed together of a single metal wire.

According to another exemplary embodiment, the intermediate latch comprises a generally S-shaped jog formed with the metal wire, and having sufficient inherent flex to extend over and operatively engage the catch, thereby holding the hook assembly in the loaded condition.

According to another exemplary embodiment, the latch of the trigger automatically operatively engages the catch upon application of opposing forces on the hook and the trigger when moving the hook assembly to the loaded condition.

According to another exemplary embodiment, in the loaded condition of the hook assembly, the point guard of the trigger is offset from the point of the hook.

In another exemplary embodiment, the present disclosure comprises a fishing lure incorporating a fish-attracting element and a mechanical hook assembly for catching fish. The term "fish-attracting element" is defined broadly herein to mean any element designed to resemble prey for the fish, or to appeal to a fishes sense of territory, curiosity, or aggression. Examples of fish-attracting elements include, but are not limited to, metal spoons, spinner mechanisms, artificial worms and other bait, fish decoys, skirts, plugs, flies, and other items intended to look like dying, injured, or fast moving fish prey.

The terms "integrally formed", "integrally joined", "integrally connected" (and the like) may be used interchangeably herein, and refer to separate elements which are formed together as a single homogenous unit or assembly. For example, two halves of a single folded metal wire may be considered integrally formed together. In one alternative embodiment, the hook and trigger may be integrally formed together of a single metal wire.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
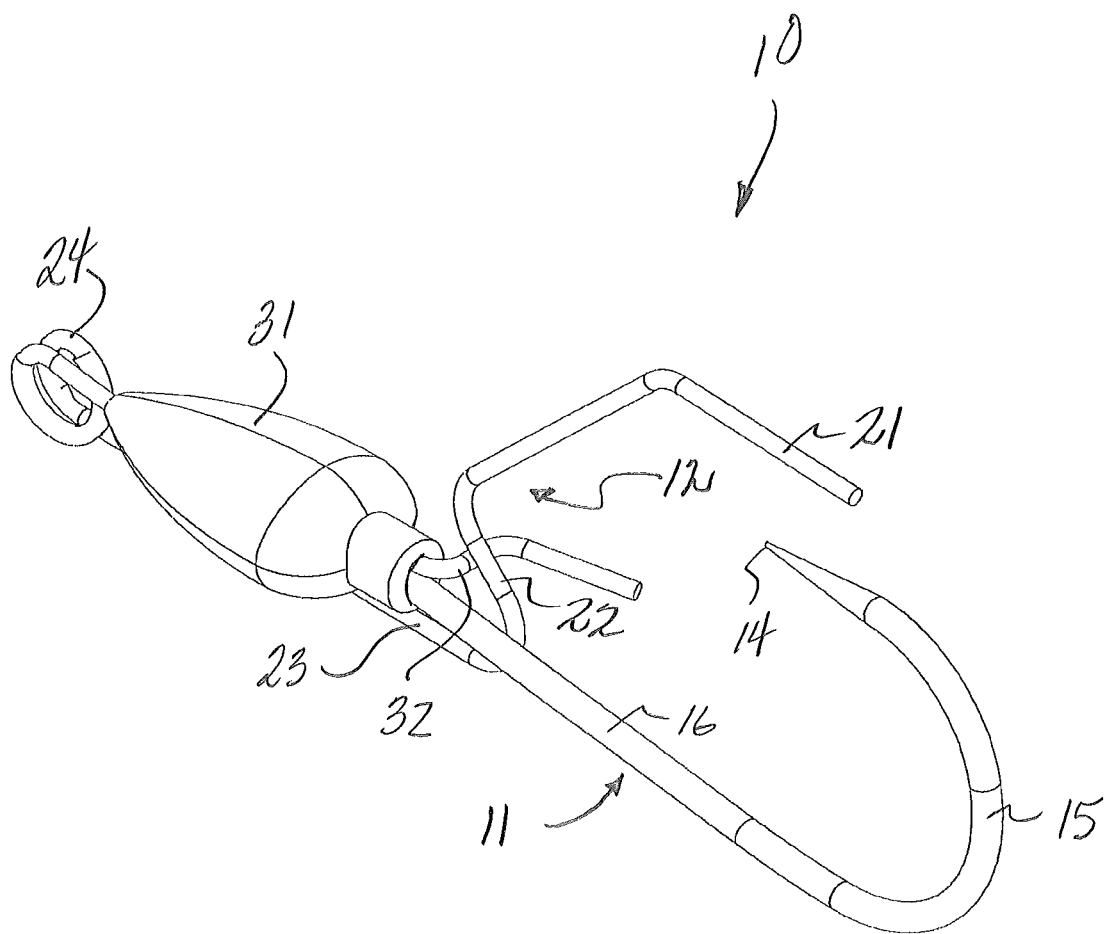
FIG. 1 is a perspective view of a mechanical hook assembly according to one exemplary embodiment of the present disclosure, and illustrating the hook assembly in a loaded condition.
Figure 2:
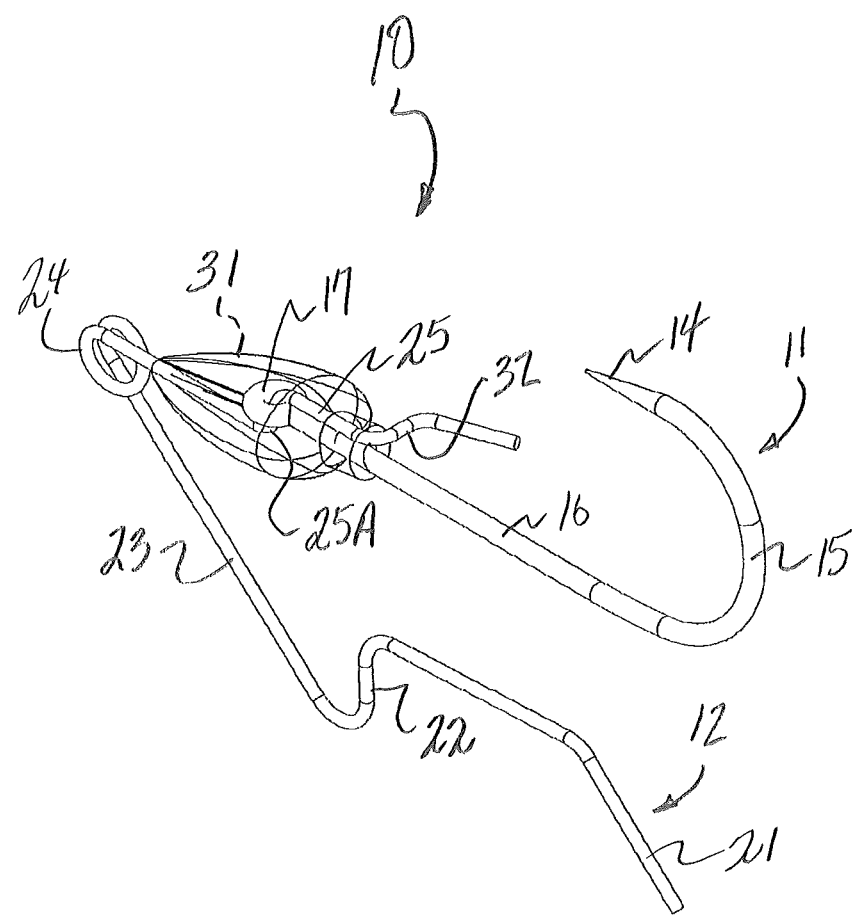
FIG. 2 is a perspective view of the exemplary hook assembly in a spread (energy released) condition, and showing the lead weight in transparency to illustrate otherwise hidden features.
Figure 3:
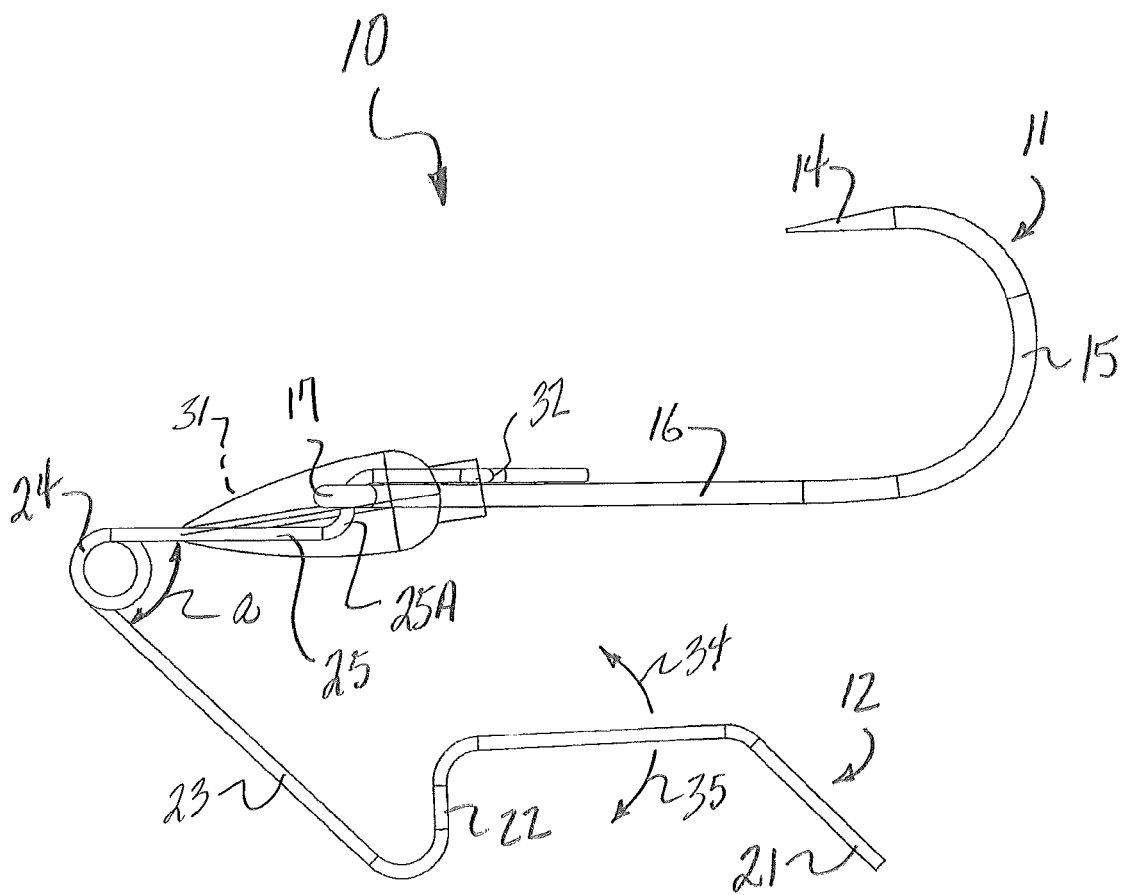
FIG. 3 is a side view of the exemplary hook assembly in the released condition.

Referring now specifically to the drawings, a mechanical hook assembly according to one exemplary embodiment of the present invention is illustrated in FIG. 1 and shown generally at reference numeral 10. The exemplary hook assembly 10 comprises a metal wire hook 11 and spring-biased single wire trigger 12. The wire hook 11 has conventional features including a point 14, bend 15, elongated shank 16, and eye 17 (See FIG. 2). The single wire trigger 12 is arranged adjacent the hook 11, and comprises an elongated distal point guard 21, an intermediate latch 22 defining a generally S-shaped jog, a proximal spring shaft 23, spring coil 24, and hook connector 25. As best shown in FIGS. 2 and 3, the hook connector 25 is integrally formed with the spring coil 24, and has a distal end which inserts through the eye 17 of the hook 11 and locates the hook 11 at an intermediate bend 25A. The hook connector 25 extends substantially parallel to the shank 16 of the hook 11, and is joined to the hook 11 by a molded lead weight 31. The exemplary lead weight 31 has a generally teardrop shape, and is permanently formed around both the shank 16 and hook connector 25. A catch 32 is integrally formed with the hook connector 25 at its distal end, and resides beside the shank 16 of the hook 11 directly adjacent the lead weight 31. The trigger coil 24 normally urges the hook assembly 10 into an open spread condition, shown in FIGS. 2 and 3, such that the spring shaft 23 of the trigger 12 extends outwardly at an angle "a" to the hook connector 25 (and parallel shank 16 of the hook 11) and in a direction opposite the bend 15.

Figure 4:
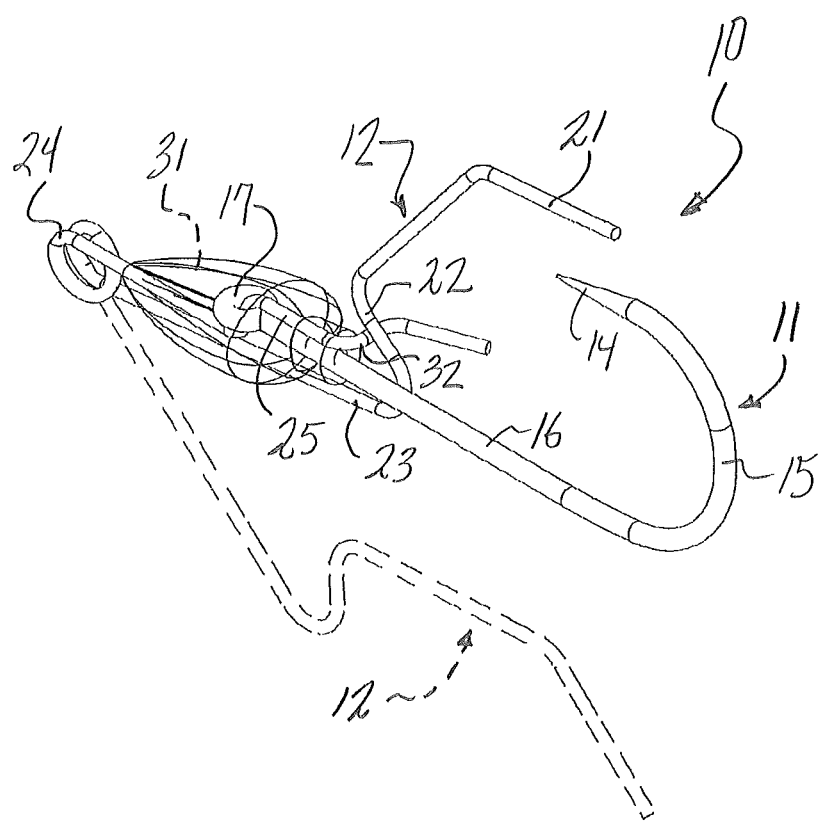
FIG. 4 is a further perspective view of the exemplary hook assembly in both the loaded and released conditions, the hook being shown in broken lines in the released condition.
Figure 5:
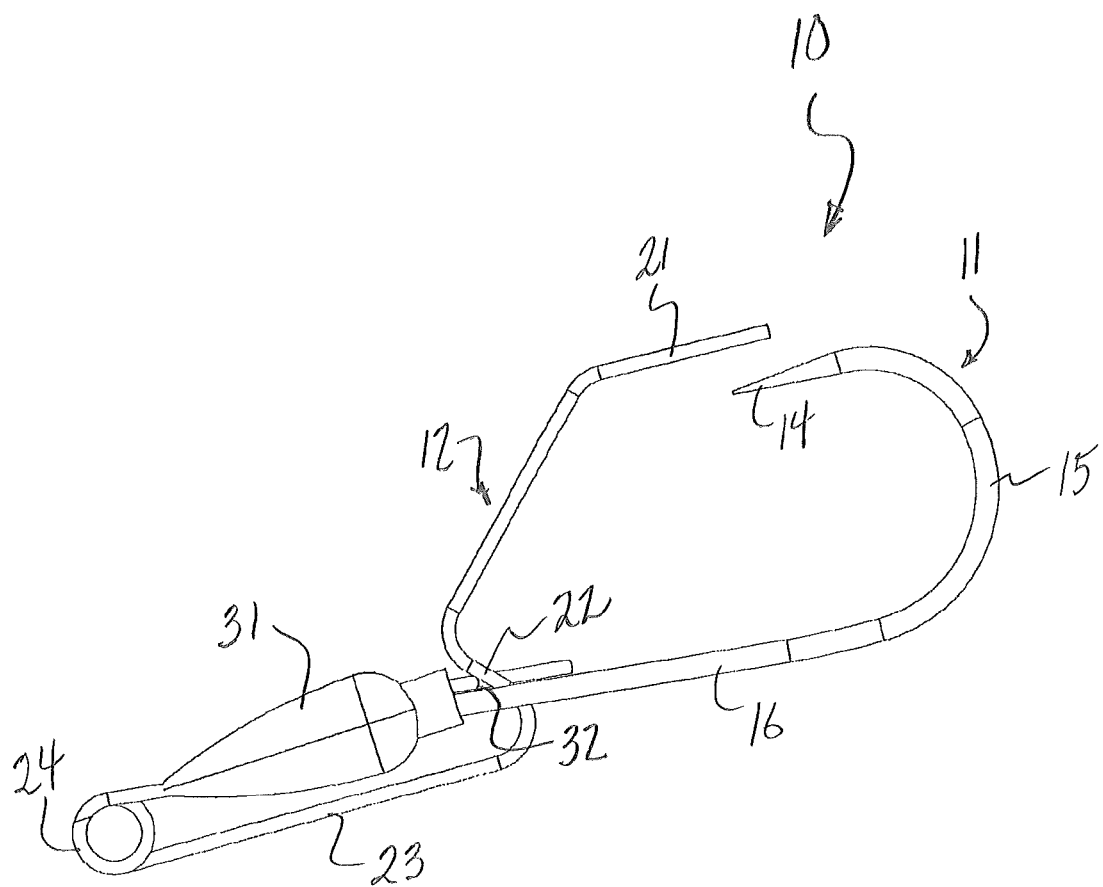
FIG. 5 is a side view of the exemplary hook assembly in the loaded condition.
Figure 6:
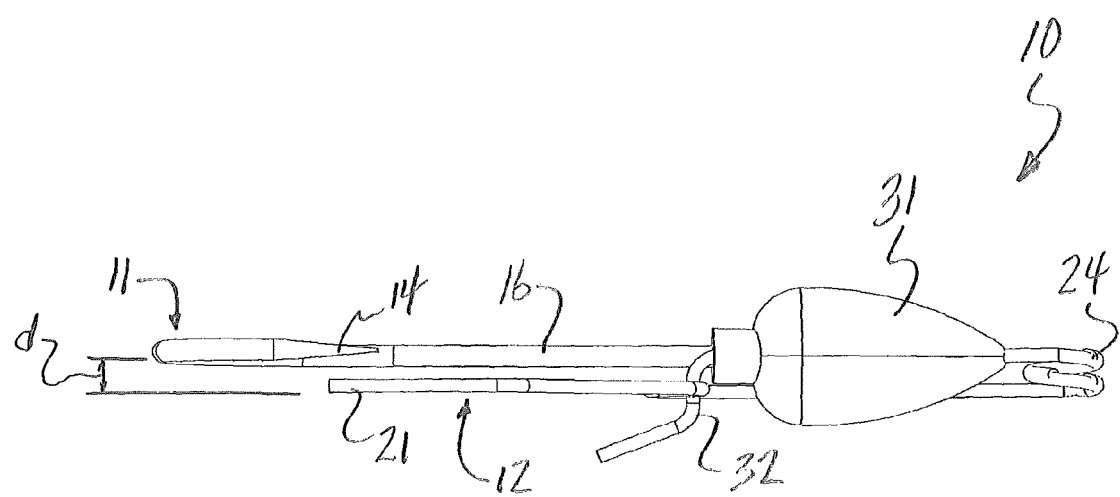
FIG. 6 is a plan view of the exemplary hook assembly in the loaded condition.

The hook assembly 10 is moved from the open spread condition to a loaded condition, shown in FIGS. 1, 4 and 5, by bringing the trigger 12 and the hook 11 together against a biasing force of the spring coil 24—thereby closing the angle "a" (FIG. 3) between the spring shaft 23 and shank 16. The exemplary hook assembly 10 may be manually loaded by applying force using the thumb and forefinger, or using plyers or other suitable tool. When loading, the S-shaped latch 22 of the trigger 12 flexes briefly to clear the catch 32, and as the trigger 12 is released, the latch 22 operatively engages the catch 32 to temporarily hold the hook assembly 10 in the loaded (stored energy) condition. The relative holding strength of the latch 22 can be readily adjusted by slightly bending the wire trigger 12 either towards or away from the hook, as indicated by arrows 34 and 35 (FIG. 3). In the loaded condition, the point guard 21 of the trigger 12 extends toward and beyond the point 14 of the hook 11, and is offset from the bend 15 a distance "d" as best shown in FIG. 6. Upon urging the point guard 21 of the trigger 12 towards the shank 16 of the hook 11, the S-shaped latch 22 of the trigger 12 disengages the catch 32 and thereby releases the hook assembly 10 for sudden outward movement to the open spread (energy released) condition.

Figure 7:
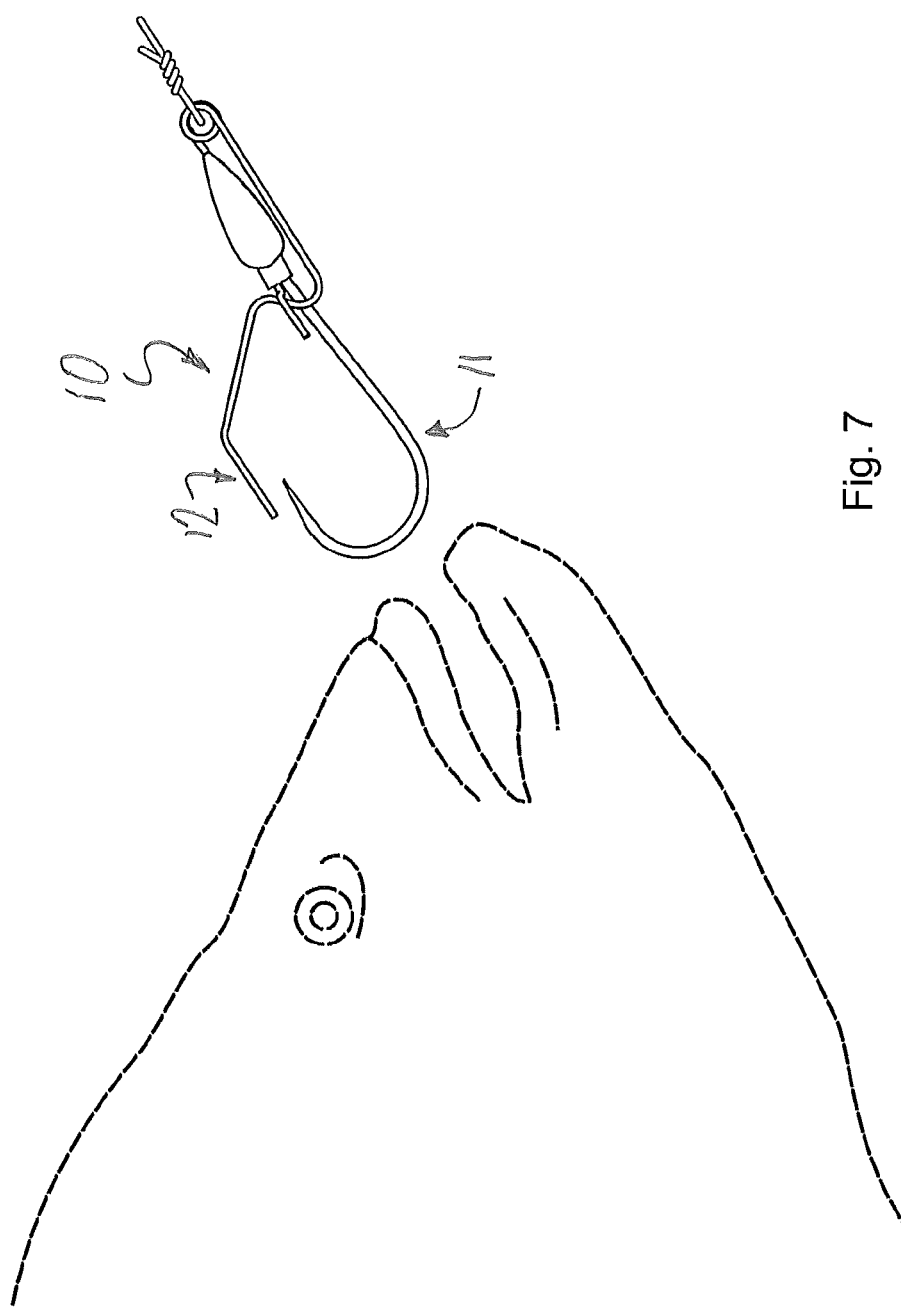
FIGS. 7, 8 and 9 are sequential views illustrating one exemplary implementation of the present hook assembly for catching fish.
Figure 8:
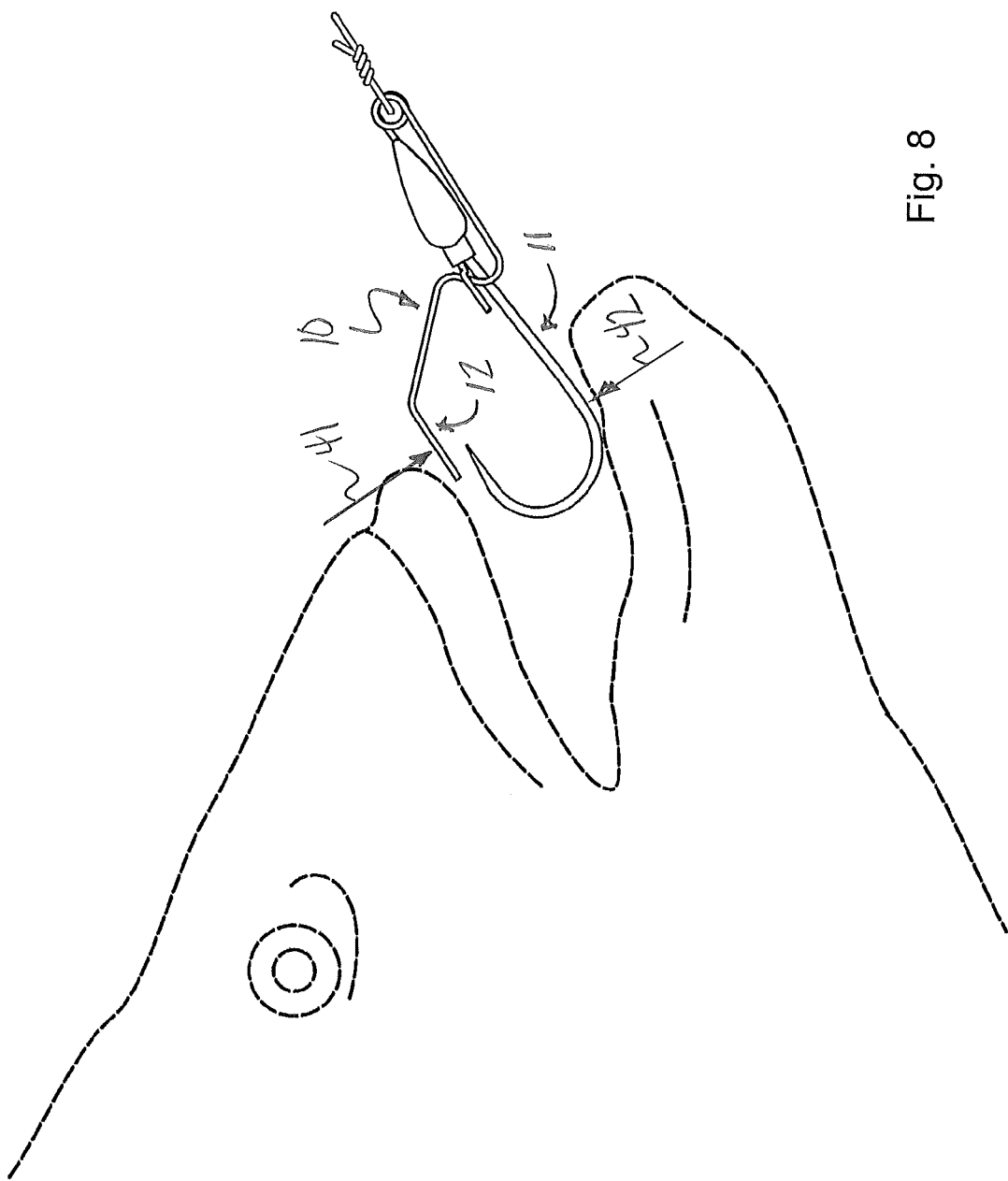
Figure 9:
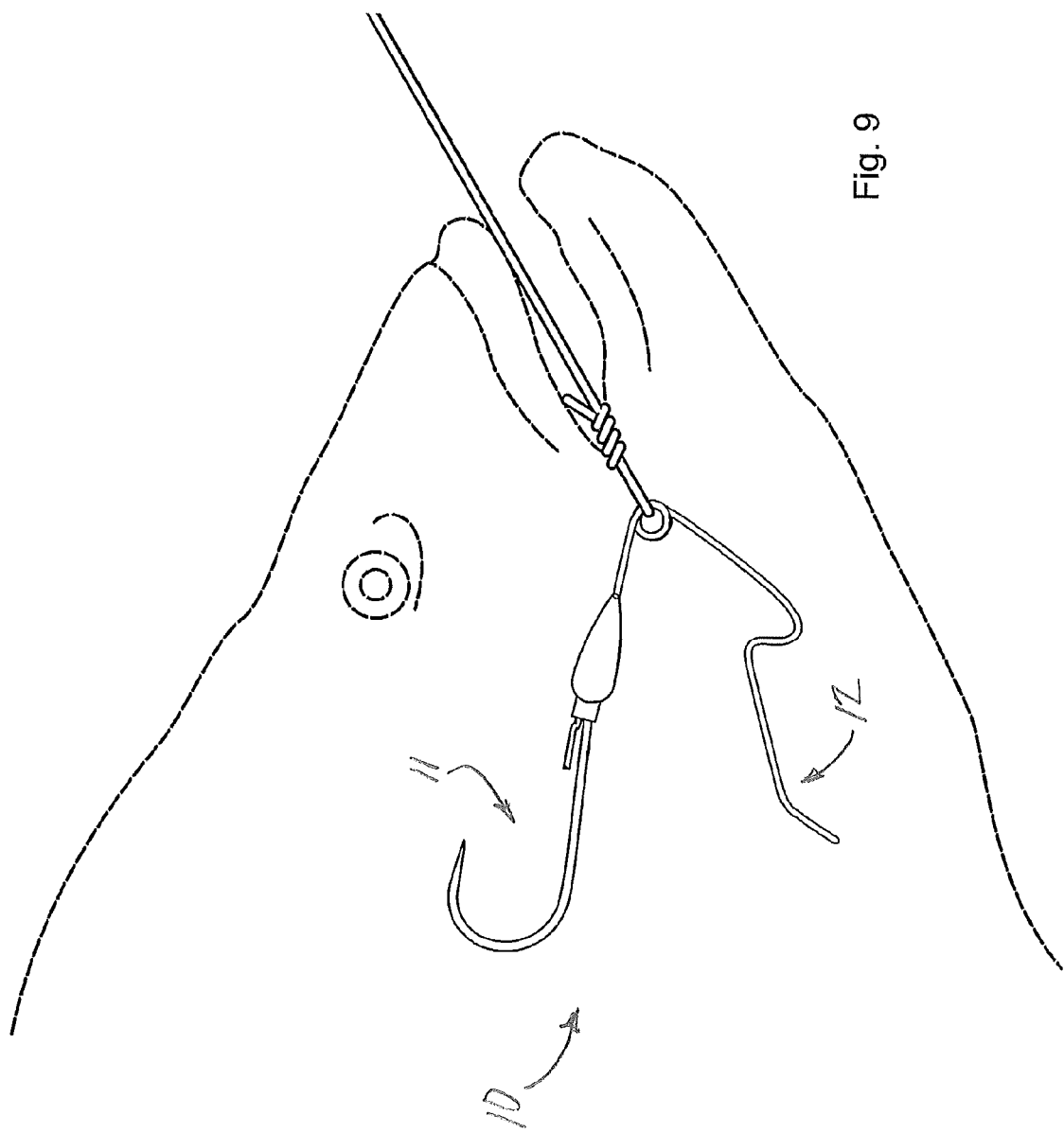

An exemplary application of the present mechanical hook assembly 10 is illustrated in FIGS. 7, 8, and 9. In this application, the hook assembly 10 might include live or artificial fish bait and/or other fish-attracting elements not shown. As the hook assembly 10 enters the mouth of the fish, the clamping (or "biting") force indicated at arrows 41 and 42 applied to the hook 11 and trigger 12 causes the latch 22 of the trigger 11 to disengage the catch 32. Once the latch 22 is disengaged, the hook assembly 10 immediately opens outwardly to its spread condition inside the mouth of the fish as shown in FIG. 9. As the fish attempts to free itself from the hook assembly 10, the point 14 of the hook 11 pierces the mouth to catch the fish.

In various embodiments, the exemplary mechanical hook 10 assembly may be incorporated in fishing lures comprising fish-attracting elements, such as metal spoons, spinner mechanisms, artificial worms and other bait, fish decoys, skirts, plugs, flies, and other items intended to look like dying, injured, or fast moving fish prey.

Figure 10:
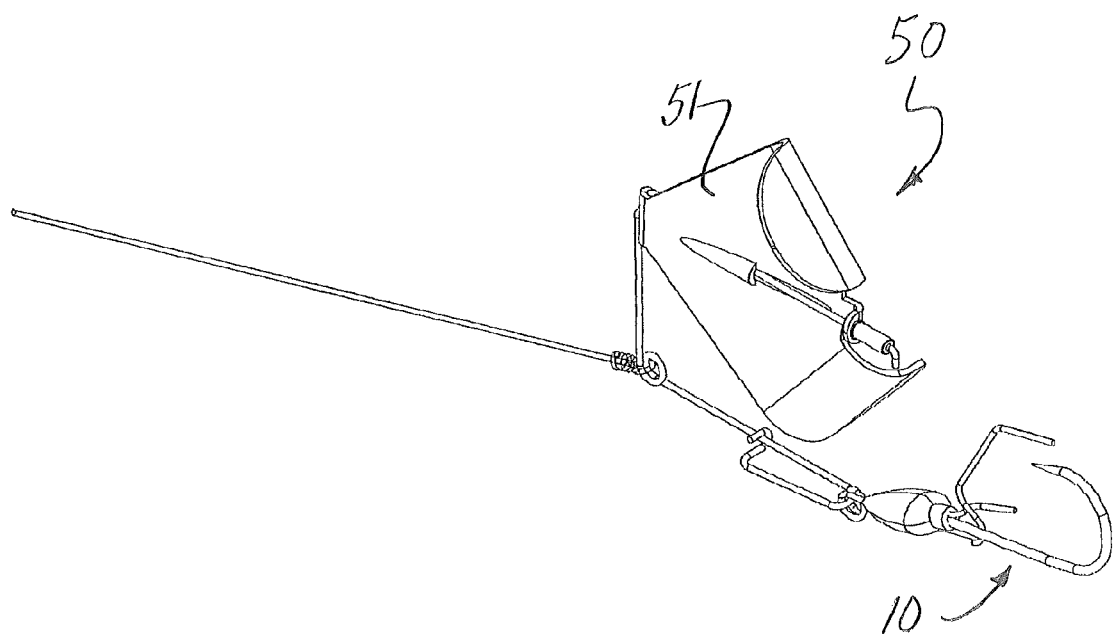
FIG. 10 is a perspective view of one exemplary fishing lure incorporating the present mechanical hook assembly.
Figure 11:
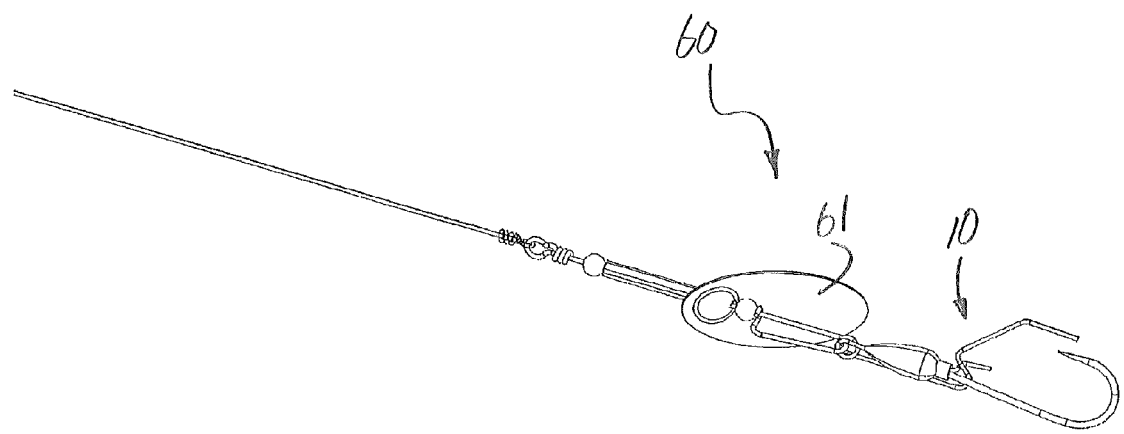
FIG. 11 is a perspective view of another exemplary fishing lure incorporating the present mechanical hook assembly.
Figure 12:
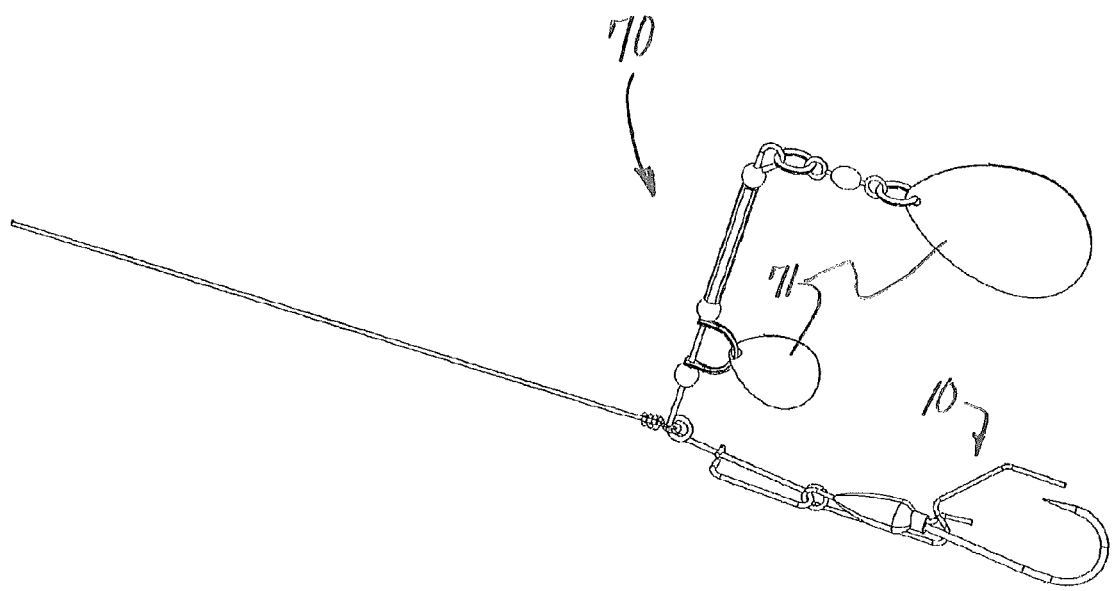
FIG. 12 is a perspective view of yet another exemplary fishing lure incorporating the present mechanical hook assembly.
Figure 13:
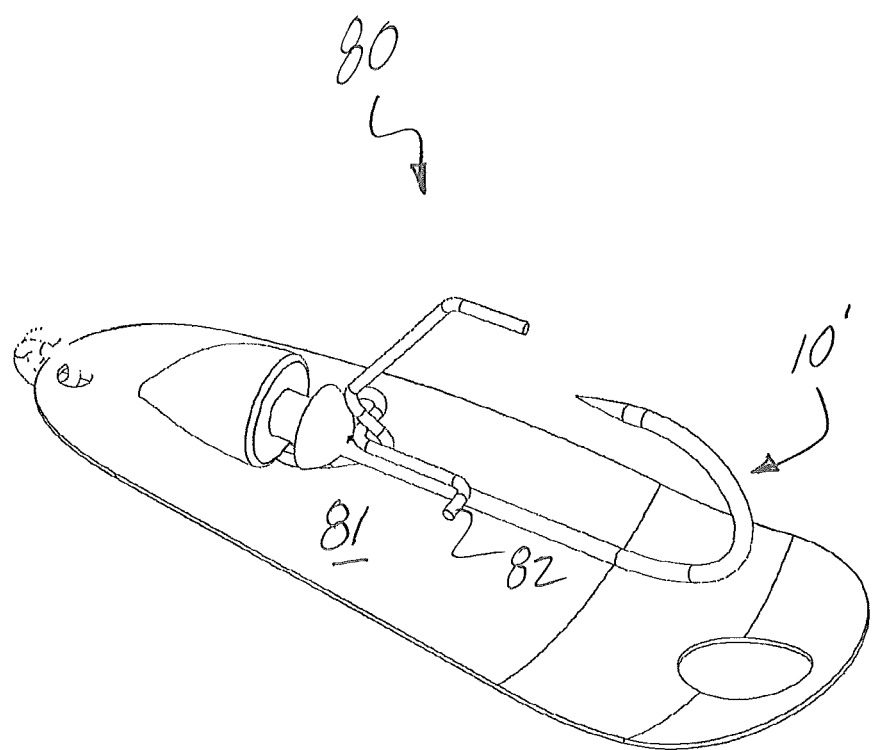
FIGS. 13, 14, and 15 are views of the exemplary hook assembly incorporated in a fishing spoon lure.
Figure 14:
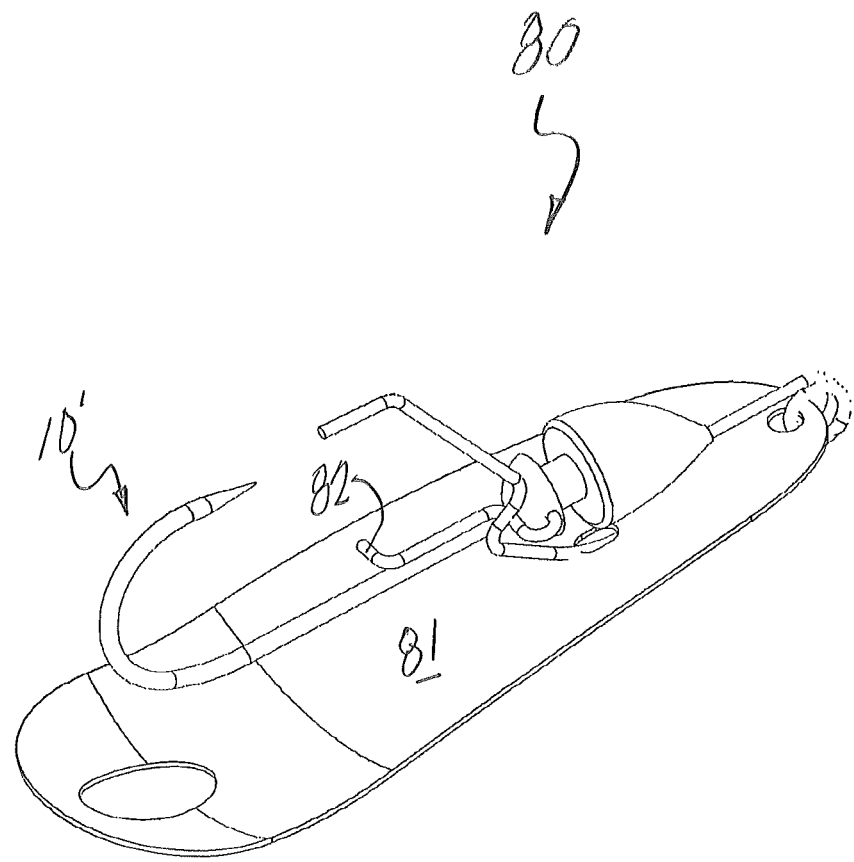
Figure 15:
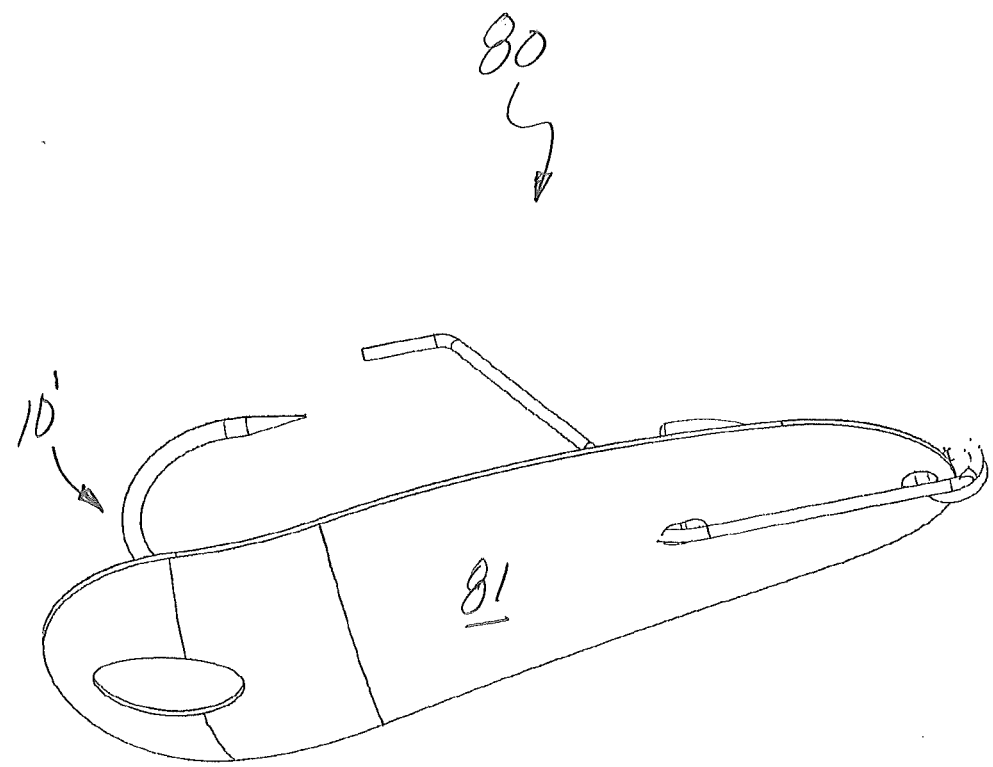

FIG. 10 shows the mechanical hook assembly in an exemplary fishing lure 50 comprising a buzz blade 51. FIGS. 11 and 12 show the present hook assembly 10 incorporated in alternative exemplary fishing lures 60 and 70 comprising respective spinner blades 61 and 71. FIGS. 13, 14, and 15 illustrate a modified hook assembly 10' incorporated in a spoon lure 80. The exemplary lure 80 comprises an oblong, generally concave, metal spoon 81 which functions primarily to attract fish by reflecting light and moving randomly through the water. The hook assembly 80 may be modified to include an integrally formed bait holder 82 extending from the distal end of the trigger.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

I claim:

1. A mechanical hook assembly for catching fish, said hook assembly comprising:
   a hook having an elongated shank with proximal and distal ends, a bend formed with the proximal end of the shank, and a point; the shank extending from the distal end towards the bend, and the bend extending from the shank to the point, and the point being laterally spaced apart a distance from the shank and extending in a direction towards the distal end;
   a spring-biased trigger adjacent said hook and comprising an elongated distal point guard, an intermediate latch, a proximal spring shaft, and a spring, the spring normally urging said hook assembly into an open spread condition such that the spring shaft of said trigger extends outwardly at an angle to the shank of said hook and in a direction opposite the bend;
   a catch located beside the shank of said hook, whereby:
   (i) said hook assembly is moved from the open spread condition to a loaded condition by bringing said trigger and said hook together against a biasing force of said spring, such that the latch of said trigger operatively engages said catch thereby holding said hook assembly in the loaded condition, and in the loaded condition the point guard of said trigger extends in a direction opposite and longitudinally beyond the point of said hook, and is spaced apart from the bend and the point, and said point guard resides a laterally spaced distance from the shank greater than the laterally spaced distance of the point to the shank; and
   (ii) upon urging the point guard of said trigger towards the shank of said hook, the latch of said trigger disengages said catch, thereby releasing said hook assembly for sudden movement to the open spread condition.

2. A mechanical hook assembly according to claim 1, wherein the spring of said trigger comprises a coil.

3. A mechanical hook assembly according to claim 2, wherein said trigger comprises a hook connector integrally formed with the coil of said spring, and extending substantially parallel to the shank of said hook.

4. A mechanical hook assembly according to claim 3, and comprising means for joining together the shank of said hook and the hook connector of said trigger.

5. A mechanical hook assembly according to claim 4, wherein said means for joining comprises a weighted body formed around respective portions of the shank of said hook and the hook connector of said trigger.

6. A mechanical hook assembly according to claim 1, wherein the point guard, intermediate latch, spring shaft, and spring are integrally formed together of a single metal wire.

7. A mechanical hook assembly according to claim 6, wherein the intermediate latch comprises a generally S-shaped jog formed with said metal wire, and having sufficient inherent flex to extend over and operatively engage said catch, thereby holding said hook assembly in the loaded condition.

8. A mechanical hook assembly according to claim 7, wherein the latch of said trigger automatically operatively engages said catch upon application of opposing forces on said hook and said trigger when moving said hook assembly to the loaded condition.

9. A fishing lure comprising a fish-attracting element and a mechanical hook assembly for catching fish, said hook assembly comprising:
   a hook adjacent said fish-attracting element and having an elongated shank with proximal and distal ends, a bend formed with the proximal end of the shank, and a point; the shank extending from the distal end towards the bend, and the bend extending from the shank to the point, and the point being laterally spaced apart a distance from the shank and extending in a direction towards the distal end;
   a spring-biased trigger adjacent said hook and comprising an elongated distal point guard, an intermediate latch, a proximal spring shaft, and a spring, the spring normally urging said hook assembly into an open spread condition such that the spring shaft of said trigger extends outwardly at an angle to the shank of said hook and in a direction opposite the bend;
   a catch located beside the shank of said hook, whereby:
   (i) said hook assembly is moved from the open spread condition to a loaded condition by bringing said trigger and said hook together against a biasing force of said spring, such that the latch of said trigger operatively engages said catch thereby holding said hook assembly in the loaded condition, and in the loaded condition the point guard of said trigger extends in a direction opposite and longitudinally beyond the point of said hook, and is spaced apart from the bend and the point, and said point guard resides a laterally spaced distance from the shank greater than the laterally spaced distance of the point to the shank;
   (ii) upon urging the point guard of said trigger towards the shank of said hook, the latch of said trigger disengages said catch, thereby releasing said hook assembly for sudden movement to the open spread condition.

10. A fishing lure according to claim 9, wherein the spring of said trigger comprises a coil.

11. A fishing lure according to claim 10, wherein said trigger comprises a hook connector integrally formed with the coil of said spring, and extending substantially parallel to the shank of said hook.

12. A fishing lure according to claim 11, and comprising means for joining together the shank of said hook and the hook connector of said trigger.

13. A fishing lure according to claim 12, wherein said means for joining comprises a weighted body formed around respective portions of the shank of said hook and the hook connector of said trigger.

14. A fishing lure according to claim 9, wherein the point guard, intermediate latch, spring shaft, and spring are integrally formed together of a single metal wire.

15. A fishing lure according to claim 14, wherein the intermediate latch comprises a generally S-shaped jog formed with said metal wire, and having sufficient inherent flex to extend over and operatively engage said catch, thereby holding said hook assembly in the loaded condition.

16. A fishing lure according to claim 15, wherein the latch of said trigger automatically operatively engages said catch upon application of opposing forces on said hook and said trigger when moving said hook assembly to the loaded condition.

* * * * *